United States Patent
Rosenberg et al.

[19]

[11] Patent Number: 6,137,929
[45] Date of Patent: Oct. 24, 2000

[54] SYSTEM AND METHOD FOR INTERFACING OPTICAL FIBERS WITH OPTICAL COMMUNICATIONS DEVICES VIA AN OPTICAL FIBER FACEPLATE

[75] Inventors: Paul K. Rosenberg, Sunnyvale; Kirk S. Giboney, Mountain View; Albert T. Yuen, Los Altos, all of Calif.

[73] Assignee: Agilent Technologies, Inc., Palo Alto, Calif.

[21] Appl. No.: 09/248,878

[22] Filed: Feb. 11, 1999

[51] Int. Cl.[7] ........................................................ G02B 6/26
[52] U.S. Cl. ................................. 385/31; 385/147; 385/89
[58] Field of Search ................................ 385/31, 147, 24, 385/56, 60, 72, 84, 85, 89, 140, 901

[56] References Cited

U.S. PATENT DOCUMENTS 5,329,386   7/1994   Birecki et al. ........................ 385/901 X

*Primary Examiner*—Phan T. H. Palmer

[57] ABSTRACT

An optical fiber faceplate transmits light signals between an optical fiber communications device and optical fibers secured by a fiber optic connector. The optical fiber faceplate includes a plurality of closely spaced optical fiber segments which prevent light signals from diverging as they pass through the faceplate. The diameters of the cores of the optical fiber segments within the faceplate are smaller than the diameters of the optical fibers secured by the fiber optic connector. Therefore, light from optical signals communicated by the optical fibers is received and transmitted through the faceplate via a plurality of optical fiber segments within the faceplate. Consequently, the faceplate does not need to be precisely aligned with either the optical fibers or the optical communications device.

15 Claims, 9 Drawing Sheets

SYSTEM AND METHOD FOR INTERFACING OPTICAL FIBERS WITH OPTICAL COMMUNICATIONS DEVICES VIA AN OPTICAL FIBER FACEPLATE

GOVERNMENT RIGHTS

The invention was made with United States Government support under Agreement No. MDA972-97-3-0008 awarded by DARPA. The United States Government has rights in the invention.

BACKGROUND OF THE INVENTION

1. Field of the Invention

The invention generally relates to techniques for interfacing optical fibers with optical fiber communications devices and, in particular, to a system and method for communicating optical signals between an optical fiber and an optical communications device via an optical fiber faceplate.

2. Related Art

In current optical fiber communications systems, a fiber optic ribbon connector typically secures a plurality of optical fibers. The fiber optic connector can be coupled to a housing which may include an optical element of transparent material, such as glass for example. The optical element couples optical signals between an optical communications device and an optical fiber secured by the fiber optic connector. As an example, the optical communications device can be a laser transmitter for transmitting optical signals, or the optical communications device can be a photodetector capable of receiving optical signals and of converting the received optical signals into electrical signals for further processing.

The optical communications device is located on a side of the optical element opposite of the fiber optic connector. Through a variety of aligning methods, the cores of the optical fibers secured by the fiber optic connector face the optical element and are aligned with the optical communications device (i.e., are aligned with the laser transmitters or photodetectors of the optical communications device). Therefore, optical signals transmitted from the cores of the optical fibers pass through the optical element in the housing and are received by the optical communications device. Also, signals transmitted by the optical communications device pass through the transparent optical element in the housing and are received by the optical fibers secured by the fiber optic connector.

By separating the optical communications device from the optical fibers secured by the fiber optic connector, the housing helps to protect the optical communications device from damage. However, the separation of the optical communications device from the optical fibers secured by the fiber optic connector creates certain problems and difficulties. For example, as known in the art, light tends to diverge as it travels. Therefore, when optical signals are transmitted out of the optical fibers secured by the fiber optic connector, the optical signals diverge (i.e., expand) while the signals travel from the optical fibers to the optical communications device. In many instances where multiple signals are being communicated, this divergence causes the optical signals to overlap and interfere with one another. In addition, the divergence of the optical signal also requires a photodetector with a larger cross-sectional area to capture the entire optical signal. Increasing the size of the photodetector usually increases the capacitance of the photodetector, thereby resulting in slower processing of the optical signal by the photodetector. Typically, the farther the optical fibers are located from the optical communications device, the more pronounced are the adverse effects described above.

In order to reduce cross talk and other adverse effects, some prior art systems utilize ball lenses in or on the optical element of the housing in order to focus the light from the core of each optical fiber secured by the fiber optic connector to the optical communications device and vice versa. However, positioning the components of the system such that the optical signals are appropriately focused can be a difficult and expensive process.

Other prior art systems utilize optical fiber stubs located in the optical element of the housing. Therefore, optical signals communicated with each optical fiber secured by the fiber optic connector pass into a corresponding optical fiber stub in the optical element of the housing. Since each light signal passes through an optical fiber stub in the optical element of the housing, the light signals are prevented from diverging as the signals pass through the optical element. However, in order to minimize losses, each optical fiber secured by the fiber optic connector and the optical communications device should be precisely aligned with an optical fiber stub in the optical element. Achieving such a precise alignment of the optical fiber stubs with the optical communications device and the optical fibers secured by the fiber optic connector can be a difficult process. Furthermore, most prior art systems for aligning optical fiber stubs with the optical communications devices and the optical fibers secured by the fiber optic connector include complex and expensive components, thereby increasing the complexity and cost of adequately aligning optical fiber stubs.

Thus, an unaddressed need exists in the industry for providing a system and method of simply and efficiently interfacing optical communications devices with cores of optical fibers secured by a fiber optic connector.

SUMMARY OF THE INVENTION

The invention overcomes the inadequacies and deficiencies of the prior art as discussed herein. The invention generally provides a system and method for communicating optical signals between optical fibers and optical communications devices via fiber optic faceplates.

In accordance with the invention, an optical fiber is secured by a fiber optic connector. The fiber optic connector is coupled to a housing unit, which is also coupled to a mechanical support. The mechanical support is attached to an optical communications device, which is housed and protected by the housing unit. A fiber optic faceplate within the housing unit allows optical signals to pass between the optical communications device and the optical fiber secured by the fiber optic connector.

The faceplate includes an array of small optical fiber segments spaced closely together. Light from an optical signal communicated between the optical communications device and the optical fiber secured by the fiber optic connector is received by the array of optical fiber segments in the faceplate and is transmitted through the faceplate. Therefore, an optical signal is transmitted between the optical communications device and the optical fiber secured by the fiber optic connector via a plurality of optical fiber segments within the faceplate.

In many instances, it is desirable to redirect the light received from an optical fiber into a different direction. Therefore, in accordance with another feature of the invention, the ends of the optical fiber segments in the faceplate extend in different directions in order to redirect the optical signal into a desirable direction.

The invention can also be viewed as providing a method for interfacing optical fibers with optical communications devices. Briefly described, the method can be broadly conceptualized by the following steps: providing an optical fiber and an optical communications device; positioning a plurality of optical fiber segments between the optical fiber and the optical communications device; communicating an optical signal between the optical fiber and the optical communications device; and simultaneously transmitting the optical signal through each of the plurality of optical fiber segments during the communicating step.

The invention has many advantages, a few of which are delineated below, as mere examples.

An advantage of the invention is that optical fibers can be easily and efficiently interfaced with optical communications devices.

Another advantage of the invention is that adverse effects from the divergence of optical signals can be reduced. Therefore, when multiple signals are being communicated simultaneously in an optical communication system, the interference between these signals can be minimized.

Another advantage of the invention is that an optical element disposed between an optical fiber and an optical communications device does not need to be precisely aligned with respect to the optical fiber or the optical communications device.

Another advantage of the invention is that an optical communications device can be housed and protected while a high quality of optical communication is maintained.

Another advantage of the invention is that the size of a photodetector capable of completely capturing an optical signal can be minimized.

Other features and advantages of the invention will become apparent to one skilled in the art upon examination of the following detailed description, when read in conjunction with the accompanying drawings. It is intended that all such features and advantages be included herein within the scope of the invention, as is defined by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the invention. Furthermore, like reference numerals designate corresponding parts throughout the several views.

DETAILED DESCRIPTION OF THE INVENTION

Figure 1:
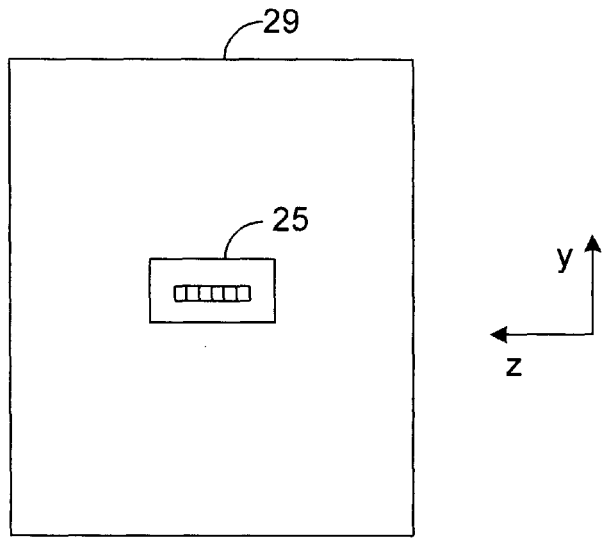
FIG. 1 is a front view of an optical communications device coupled to a mechanical support.

FIG. 1 shows an optical communications device 25 coupled to a mechanical support 29. The optical communications device 25 is designed to communicate optical signals. For example, and in no way limited thereto, optical communications 25 can include a conventional laser diode for transmitting light signals, or optical communications device 25 can include a conventional photodetector for receiving light signals and for converting the received light signals into electrical signals for further processing.

Figure 2A:
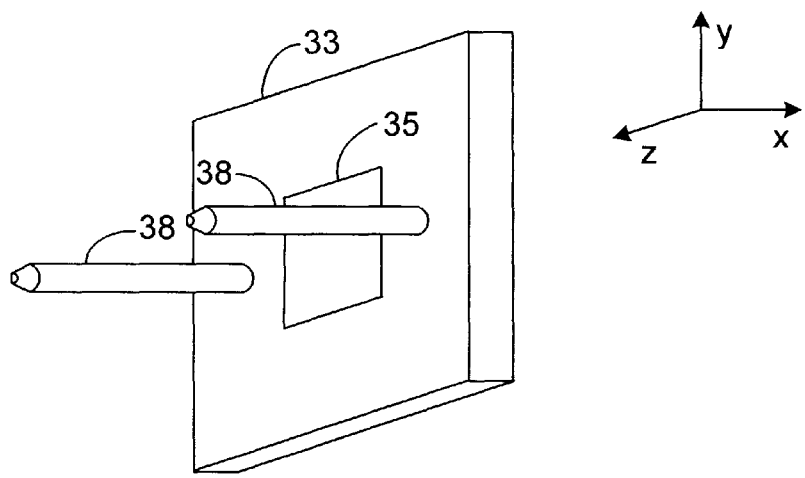
FIG. 2A is a three dimensional side view of an interface system having a faceplate in accordance with the invention.

FIG. 2A depicts a housing unit 33 configured to engage the mechanical support 29 of FIG. 1 and to protect the optical communications device 25 coupled to the mechanical support 29. The housing unit 33 includes a faceplate 35, which is a transparent medium configured to allow optical signals to pass through the housing unit 33. Securing members 38 are attached to the housing unit 33 and are configured to engage a fiber optic connector and to secure the fiber optic connector in the y-direction and the z-direction, as will be discussed in further detail below.

Figure 2B:
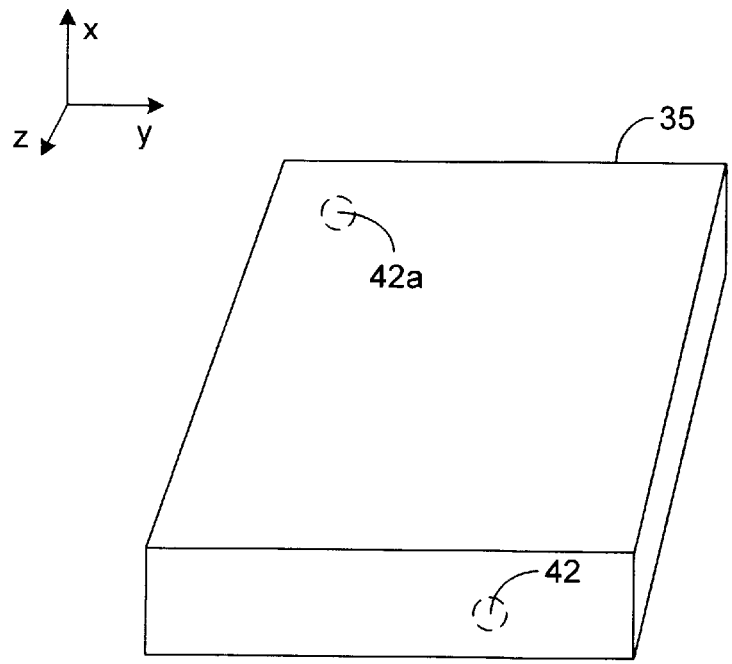
FIG. 2B is a three dimensional view of the faceplate depicted in FIG. 2A.
Figure 2C:
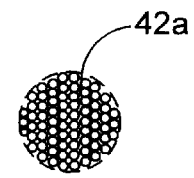
FIG. 2C is an enlarged view of the end faces of the optical fiber segments that comprise the faceplate depicted in FIG. 2A.
Figure 2D:
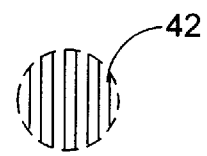
FIG. 2D is an enlarged view of the optical fiber segments that comprise the faceplate depicted in FIG. 2A.

The faceplate 35 is preferably comprised of an array of closely spaced optical fiber segments 42, as depicted by FIG. 2B. The optical fiber segments 42 depicted in FIG. 2B extend in the x-direction, thereby exposing the end faces 42a of the optical fiber segments 42. Furthermore, as will be discussed further below, the optical fiber segments 42 are preferably much smaller than the standard optical fibers used to transmit light through current communications networks. The faceplate 35 is a commercially available product which has been used in many charge coupled device (CCD) applications.

Figure 3A:
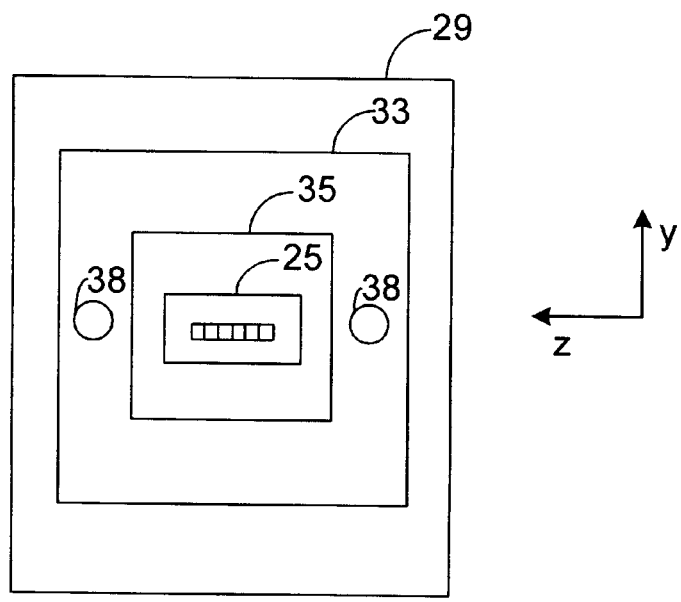
FIG. 3A is a front view of the system depicted by FIG. 2A coupled to the mechanical support of FIG. 1.
Figure 3B:
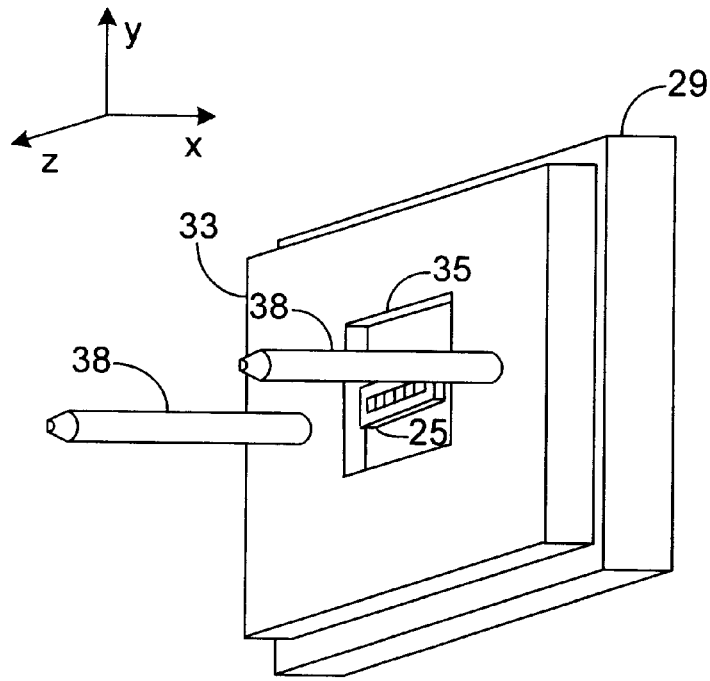
FIG. 3B is a three dimensional side view of the system depicted by FIG. 3A.
Figure 3C:
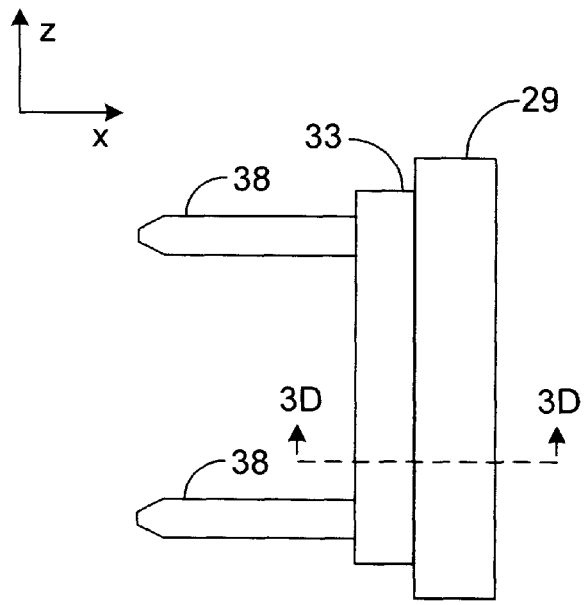
FIG. 3C is a top view of the system depicted by FIG. 3A.
Figure 3D:
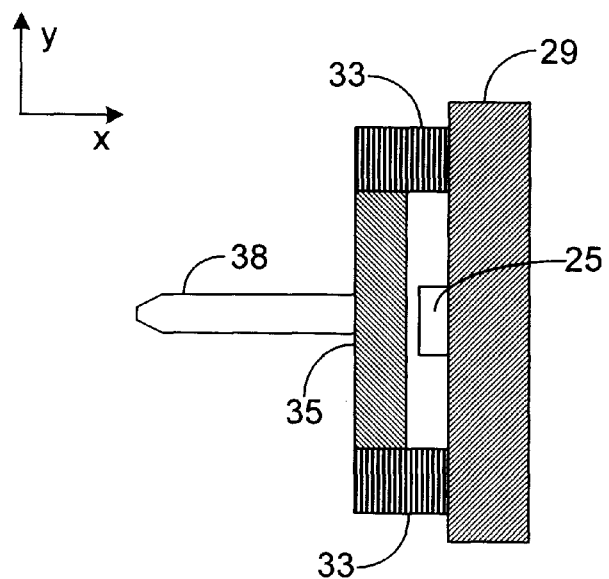
FIG. 3D is a cross-sectional view of the system depicted by FIG. 3C.

The housing unit 33 is preferably attached to the mechanical support 29, as depicted by FIGS. 3A–3D. As can be seen by FIG. 3A, the housing unit 33 is preferably positioned on the mechanical support 29 so that the optical communications device 25 is exposed by the transparent faceplate 35. Furthermore, as can be seen by reference to FIG. 3D, the surface of the faceplate 35 is preferably indented with respect to the surface of the housing unit 33 on at least one side. This indention allows the housing unit 33 to engage mechanical support 29 without having the faceplate 35 engage and damage the optical communications device 25. Although the faceplate 35 can be flush with the optical communications device 25 when the housing unit 33 is engaged with the mechanical support 29, it is preferable that there be a small separation between the faceplate 35 and the optical communications device 25 in order to ensure that the optical communications device 25 is not damaged.

Figure 4:
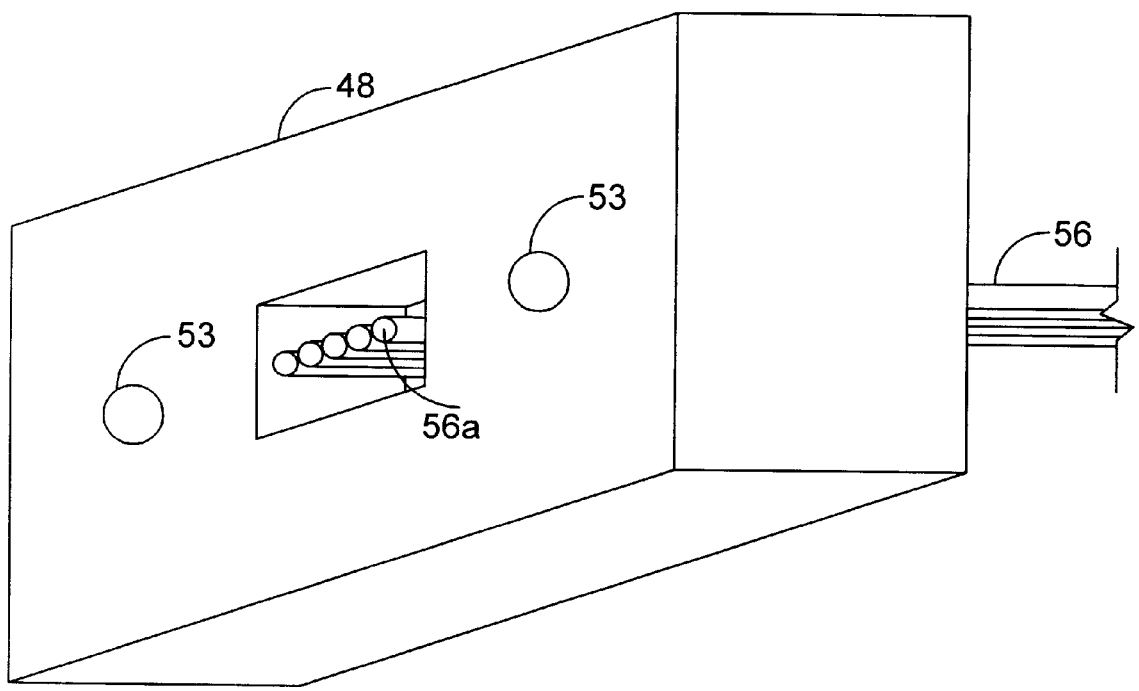
FIG. 4 is a three dimensional side view of a fiber optic connector.

FIG. 4 depicts a fiber optic connector 48. The fiber optic connector 48 includes holes 53, which are configured to receive securing members 38 (FIG. 2A). The fiber optic connector 48 is designed to secure at least one optical fiber 56 having an optical fiber core exposed at the end 56a of the optical fiber 56. The fiber optic connector 48 may include other components (not shown for simplicity) that help to secure the optical fibers 56.

The optical fibers 56 are preferably conventional optical fibers used by current networks and other systems to transmit optical signals. The cores of the optical fibers 56 are preferably larger than the cores of the optical fiber segments 42 in the faceplate 35. In the preferred embodiment, the cores of the optical fiber segments 42 in the faceplate 35 are approximately on the order of one-eighth in diameter as the cores of the optical fibers 56, although other sizes are also possible.

Figure 5:
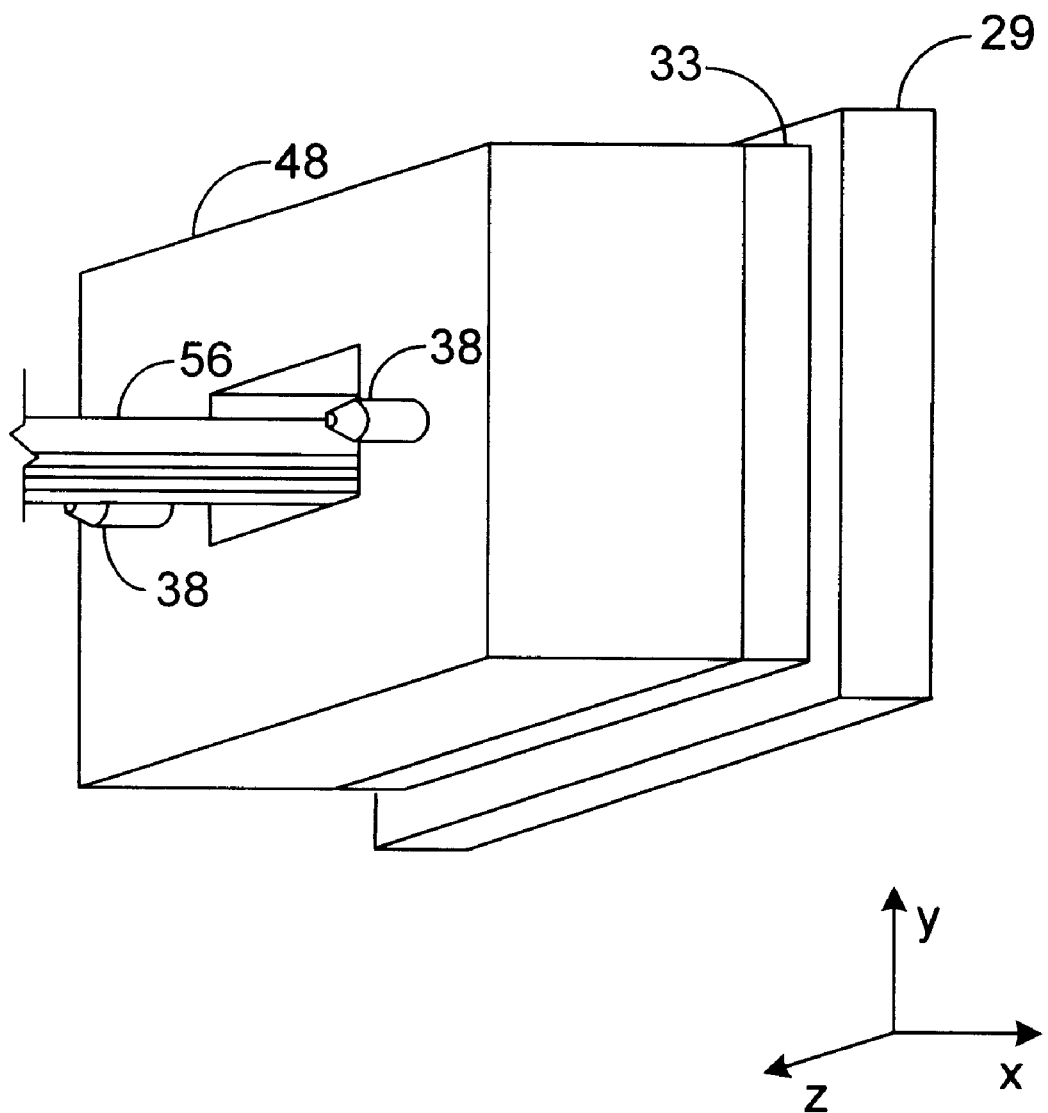
FIG. 5 is a three dimensional side view of the system depicted by FIG. 3B coupled to the fiber optic connector of FIG. 4.

The fiber optic connector 48 is designed to engage the housing unit 33, as depicted by FIG. 5. In this regard, the holes 53 of the fiber optic connector 48 (FIG. 4) receive the securing members 38 (FIG. 2A), and the fiber optic connector 48 slides over the securing members 38 until the fiber optic connector 48 engages the housing unit 33. The shape of the securing members 38 preferably correspond to the shape of the holes 53 so that the fiber optic connector 48 is secured in the y-direction and the z-direction when the fiber optic connector 48 is engaged with the housing unit 33. For example, when the holes 53 are circular, as depicted by FIG. 4, the securing members 38 are preferably cylinders having a diameter approximately equal to the diameter of the holes 53.

Preferably, the positioning of the optical communications device 25, the securing members 38, the holes 53, and the optical fibers 56 is such that the cores of the optical fibers 56 are aligned with the optical communications device 25, when the fiber optic connector 48 is engaged with the housing unit 33. There are many techniques for properly aligning the optical fibers 56 with the optical communications device 25. One technique for properly aligning the optical fibers 56 with the optical communications device 35 is discussed in copending U.S. patent application entitled "System and Method for Aligning Optical Fibers with Optical Fiber Communications Device," assigned serial no. (to be determined) (attorney docket no. 10980925-1) and filed by Rosenberg et al., which is incorporated herein by reference.

Since the optical fibers 56 are aligned with the optical communications device 25, optical signals can be communicated between the optical fibers 56 and the optical communications device 25 via the transparent faceplate 35. In this regard, each optical signal is coupled into a plurality of the optical fiber segments 42 within the faceplate 35. The coupling of each optical signal into a plurality of optical fiber segments 42 occurs because the optical fiber segments 42 are smaller than the optical fibers 56. Therefore, a plurality of optical fiber segments 42 are located in the area of the faceplate 35 that receives the optical signal. As a result, light from each optical signal passes through a plurality of the optical fiber segments 42 in the faceplate 35 and is output at the opposite end of the faceplate 35. Because the light from each optical signal is passing through optical fiber segments 42, the optical signals are prevented from diverging as the optical signals pass through the faceplate 35, thereby reducing the effects of cross talk and other adverse effects.

Figure 6A:
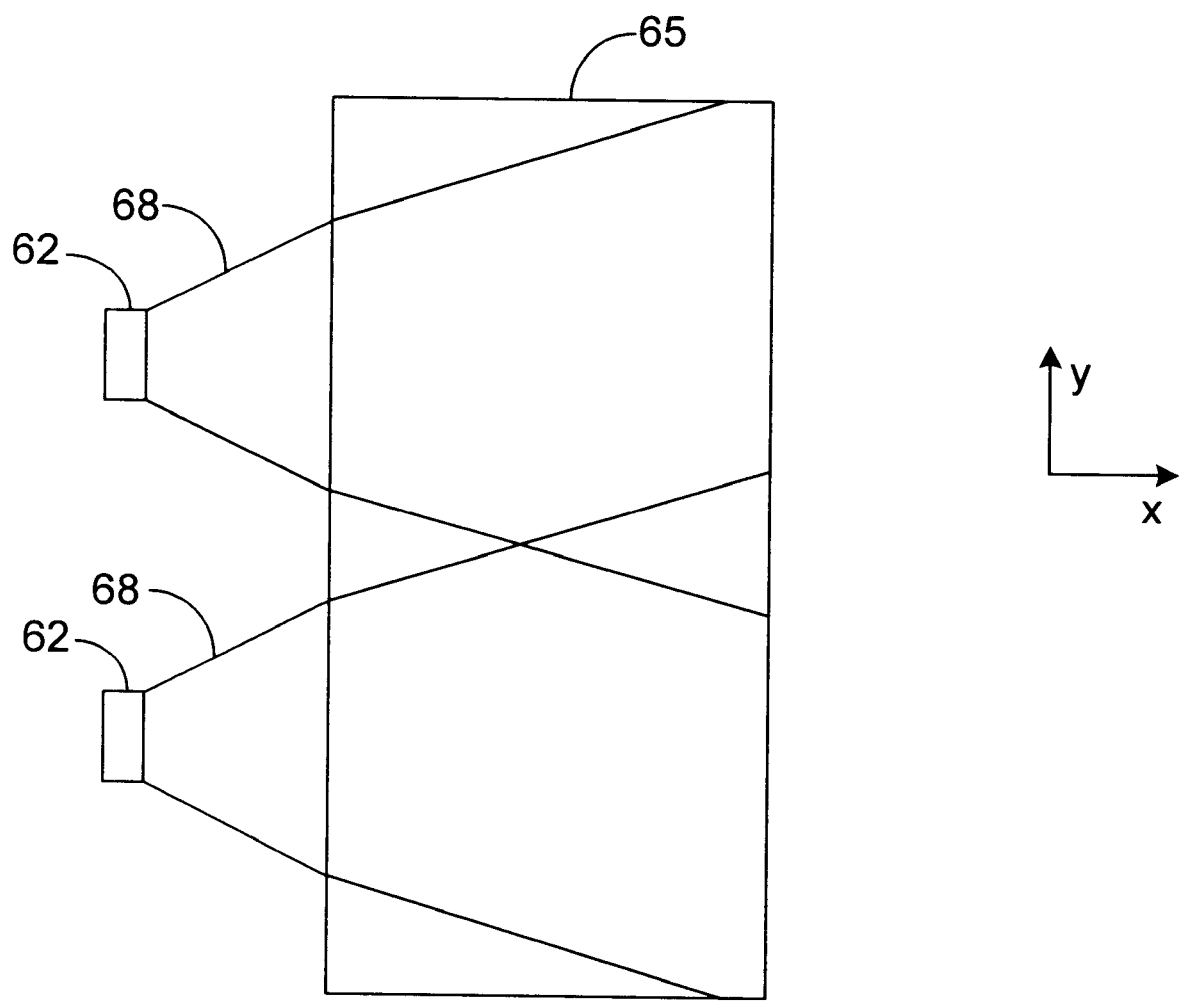
FIG. 6A is a side view of optical signals being transmitted through a faceplate of the prior art.
Figure 6B:
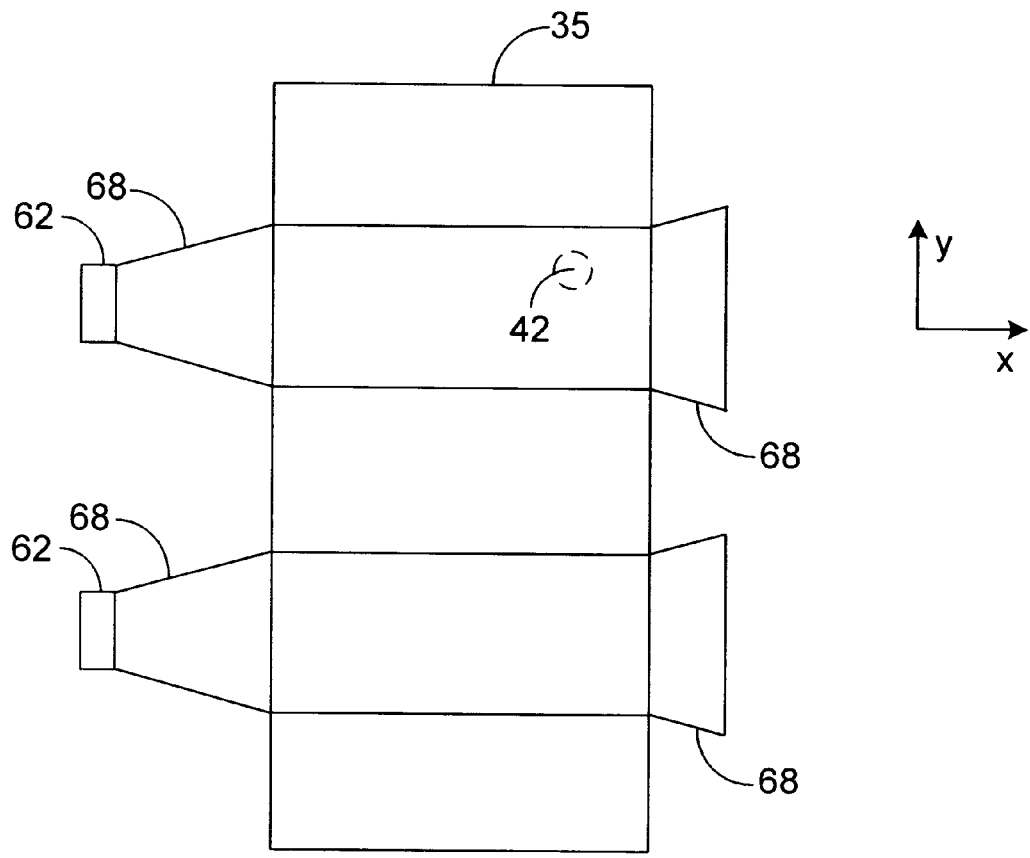
FIG. 6B is a side view of optical signals being transmitted through the faceplate of FIG. 2B.
Figure 6C:
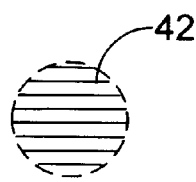
FIG. 6C is an enlarged view of the optical fiber segments that comprise the faceplate depicted in FIG. 6B.

As an example, refer to FIGS. 6A and 6B, where two optical signals are being transmitted by two transmitters 62. When the signals are being transmitted from the optical fiber 56, the transmitters 62 are the cores of the optical fibers within 56, and when the optical signals are being transmitted from the optical communications device 25, the transmitters 62 can be laser transmitters within the optical communications device 25.

FIG. 6A depicts a faceplate 65 of the prior art where the faceplate 65 is comprised of a transparent material such as glass, for example. The faceplate 65 depicted by FIG. 6A does not include the optical fiber segments 42 described above. As can be seen by reference to FIG. 6A, the optical signals 68 diverge as the signals 68 pass through the faceplate 65. The divergence of the optical signals 68 eventually causes the signals 68 to overlap resulting in cross talk. However, as can be seen by reference to FIG. 6B, the divergence of the optical signals 68 is prevented as the signals 68 pass through the faceplate 35 of the invention.

Furthermore, the exploded portion of FIG. 6B shows the feature that light from each optical signal 68 passes through a plurality of optical fiber segments 42 as described above. Since each bit of an optical signal simultaneously passes through a plurality of optical fiber segments 42 within the faceplate 35, the transmitter 62 does not need to be precisely aligned with respect to any single optical fiber segment 42. In this regard, the faceplate 35 can be shifted in the y-direction or the z-direction without affecting the transmission of the optical signals 68 through the faceplate 35. This is because each optical signal 68 couples into whichever of the optical fiber segments 42 are in the path of the light from the optical signal 68. Therefore, as the faceplate 35 is shifted, each optical signal 68 is transmitted through different optical fiber segments 42, but the path of light for each optical signal 68 remains unchanged. As a result, the faceplate 35 does have to be precisely aligned with respect to the cores of the optical fibers 56 or to the optical communications device 25. The faceplate 35 only should be aligned with the optical communications device 25 and the optical fibers 56 to the extent that at least some portion of the faceplate 35 receives the optical signals 68 from the optical communications device 25 or from the optical fibers 56.

In many optical fiber systems, the optical fibers 56 extend in a different direction than that depicted by FIG. 5. Therefore, the end faces of the optical fibers 56 do not directly face the side of the optical communications device 25 that communicates optical signals. In this situation, it may be desirable for the faceplate 35 to redirect the optical signals 68 as they pass through the faceplate 35 in order to enable communication between the optical communications device 25 and the optical fibers 56.

Figure 7A:
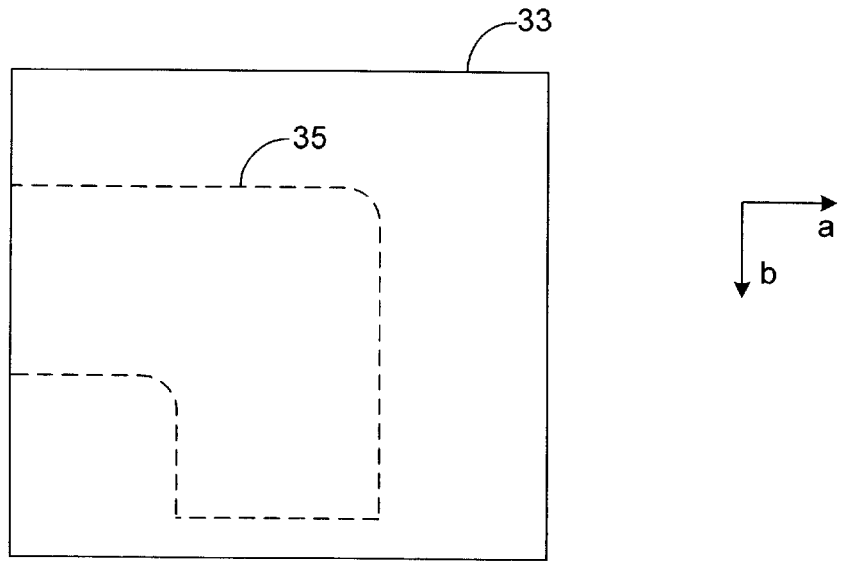
FIG. 7A is a side view of a housing unit of the invention, wherein the optical fibers within the faceplate of the housing unit are bent in order to redirect the optical signals.
Figure 7B:
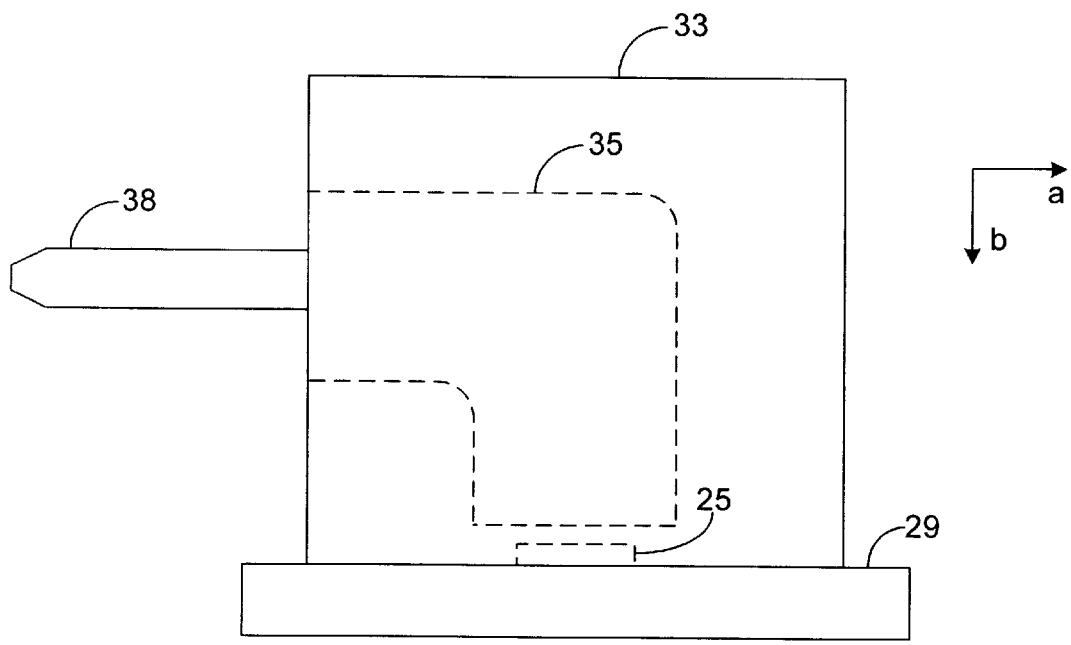
FIG. 7B is a side view of the housing unit of FIG. 8A coupled to a mechanical support which is attached to an optical communications device.

FIG. 7A depicts an embodiment of the faceplate 35 that easily redirects optical signals 68 in a different direction (e.g., 90 degrees). As can be seen by FIG. 7A, the faceplate 35, and, hence, the optical fiber segments 42 are bent approximately at a right angle so that the optical signals 68 are output in a direction approximately perpendicular to the direction of input. As an example, if an optical signal 68 traveling in the a-direction is received by the optical fiber segments 42, the optical fiber segments 42 will transmit the optical signal 68 through the housing unit 33 and will output the optical signal 68 in the b-direction. FIG. 7B shows the housing unit 33 and faceplate 35 depicted in FIG. 7A coupled to a mechanical support 29. As can be seen with reference to FIG. 7B, optical signals received by the faceplate in the a-direction can be easily turned toward the optical communications device 25 (i.e., turned toward the b-direction).

Although FIG. 7B depicts an embodiment where the optical signals are turned about 90 degrees, it should be noted that optical signals 68 can be redirected in other directions by bending the optical fiber segments 42 in different directions. Accordingly, the optical signals 68 received by the faceplate 35 can be output by the faceplate 35 in any desirable direction.

In concluding the detailed description, it should be noted that it will be obvious to those skilled in the art that many variations and modifications may be made to the preferred embodiment without substantially departing from the invention. All such variations and modifications are intended to be included herein within the scope of the invention, as set forth in the following claims.

We claim:

1. An optical interface system, comprising:
   an optical fiber including a core;
   an optical communications device; and
   an array of optical fiber segments positioned between said optical fiber and said optical communications device, each of said optical fiber segments including a core with a diameter smaller than a diameter of said core of said optical fiber.

2. The system of claim 1, wherein:
   said each of said optical fiber segments respectively has a first end and a second end;
   said core of said optical fiber faces said first end;
   said optical communications device faces said second end; and
   said each of said optical fiber segments transmits light received from one of said ends to the other of said ends.

3. The system of claim 1, wherein said first end and said second end extend in different directions.

4. The system of claim 1, wherein said each of said optical fiber segments is bent length ways through approximately a right angle.

5. The system of claim 1, wherein said system additionally comprises:
   a fiber optic connector coupled to said optical fiber;
   a mechanical support to which said optical communications device is coupled; and
   a housing unit housing said array of optical fiber segments and coupled to said mechanical support and said fiber optic connector.

6. The system of claim 1, wherein parallel ones of said optical fiber segments transmit an optical signal.

7. The system of claim 6, wherein said optical signal is simultaneously transmitted through said each of said optical fiber segments.

8. An optical interface system, comprising:
   means for providing an optical signal;
   means for receiving said optical signal; and
   means for transmitting said optical signal between said providing means and said receiving means, said transmitting means including an array of optical fiber segments simultaneously transmitting said optical signal.

9. The system of claim 8, wherein parallel ones of said optical fiber segments simultaneously transmit said optical signal.

10. The system of claim 8, wherein:
    said providing means includes an optical fiber having a core; and
    each of said array of optical fiber segments has a core smaller than said core of said optical fiber.

11. The system of claim 8, wherein:
    said receiving means includes an optical fiber having a core; and
    each of said array of optical fiber segments has a core smaller than said core of said optical fiber.

12. The system of claim 8, wherein said array of optical fiber segments changes a direction of said optical signal.

13. A method for interfacing optical fibers with optical communications devices, comprising steps of:
    providing an optical fiber, an optical communications device and an array of optical fiber segments;
    positioning said array of optical fiber segments between said optical fiber and said optical communications device; and
    simultaneously transmitting an optical signal through each of said optical fiber segments.

14. The method of claim 13, further comprising a step of changing the direction of said optical signal during said transmitting step.

15. The method of claim 13, wherein said transmitting step includes transmitting said optical signal through parallel ones of said optical fiber segments.

* * * * *